United States Patent [19]

Inoue

[11] 4,141,634
[45] Feb. 27, 1979

[54] LIGHT LEAKAGE PREVENTING DEVICE FOR FOCAL PLANE SHUTTERS

[75] Inventor: Nobuyoshi Inoue, Kawagoe, Japan

[73] Assignee: Copal Company Limited, Tokyo, Japan

[21] Appl. No.: 855,459

[22] Filed: Nov. 28, 1977

[30] Foreign Application Priority Data

Nov. 27, 1976 [JP] Japan .......................... 51-158634[U]

[51] Int. Cl.$^2$ ...................... G03B 19/12; G03B 13/02; G03B 9/40
[52] U.S. Cl. .................................. 354/154; 354/219; 354/246
[58] Field of Search ............... 354/152, 150, 155, 151, 354/200, 219, 53, 54, 57, 223, 153, 154, 156, 202, 289, 288, 248, 249, 232, 246

[56] References Cited

U.S. PATENT DOCUMENTS

| | | | |
|---|---|---|---|
| 3,094,913 | 6/1963 | Morelle | 354/154 |
| 3,411,422 | 11/1968 | Sauer | 354/154 |
| 3,821,768 | 6/1974 | Urano et al. | 354/219 |
| 3,999,196 | 12/1976 | Inoue | 354/154 |

FOREIGN PATENT DOCUMENTS

1277664 9/1968 Fed. Rep. of Germany ........... 354/154
1285862 12/1968 Fed. Rep. of Germany ........... 354/154

*Primary Examiner*—Donald A. Griffin
*Attorney, Agent, or Firm*—Cushman, Darby & Cushman

[57] ABSTRACT

A light leakage preventing device for focal plane shutters made by interposing a shielding member between a view finder optical system and shutter base plates to intercept a light reaching a film surface through an air gap defined by the shutter base plates from within the view finder optical system. Said shielding member is moved from a light intercepting position to a non-light intercepting position by an interlocking lever operated between the operation of a release button of a photographic camera and the beginning of the operation of shutter blades and is moved from the non-light intercepting position to the light intercepting position simultaneously with the introduction of a light into the view finder optical system from an object to be photographed.

4 Claims, 8 Drawing Figures

LIGHT LEAKAGE PREVENTING DEVICE FOR FOCAL PLANE SHUTTERS

BACKGROUND OF THE INVENTION

1. Field of the Invention

The present invention relates to light leakage preventing devices for photographic cameras provided with focal plane shutters and more particularly to a device for preventing a light from leaking onto a film surface from within a view finder optical system in a focal plane shutter of a type in which a part of shutter blades will advance into the view finder optical system at the time of the shutter operation.

2. Description of the Prior Art

Generally, in a photographic camera provided with a focal plane shutter, as a view finder optical system and a shutter device are perfectly isolated from each other, a light can not leak onto a film surface through the shutter device form the view finder optical system. However, for example, as disclosed in U.S. Pat. No. 3,999,196, there have been defects that, in the case of a focal plane shutter of a type in which a part of shutter blades is so arranged as to advance into a view finder optical system of a photographic camera at the time of the shutter operation in order to reduce the height of the camera, a port for the advance of the shutter blades into the view finder optical system will be required and therefore a part of the light passing through the view finder optical system through this port will advance into the shutter device and, as a result, an undesirable exposure will be performed on the film surface.

These defects shall be concretely explained in the following with reference to a conventional example schematically shown in FIGS. 1 to 3. In FIG. 1, reference numeral 1 indicates a view finder optical system provided on the upper part of a camera body B and consisting of a penta-prisim 2, a lens group 3 and a space 4 formed between them. Numeral 5 indicates a shutter device positioned just before a film F below the view finder optical system 1. The shutter device 5 consists of base plates 6 and 7 and a partition plate 8 arranged parallelly with each other with a predetermined spacing between them, a front shutter blade group 9 consisting of a plurality of opaque thin plates foldably and developably supported within a space defined by the base plate 6 and partition plate 8, a rear shutter blade group 10 of a plurality of opaque thin plates foldably and developably supported within a space defined by the partition plate 8 and base plate 7 and a driving means not illustrated provided on the base plate 6 to move the front shutter blade group 9 and rear shutter blade group 10 between the folded position and unfolded position. Exposure apertures 6a, 7a and 8a coordinated on an optical axis are formed respectively in the base plates 6 and 7 and partition plate 8. Numeral 11 indicates a well known reflecting mirror supported rotatably on the camera body B and serving to introduce a light from an object to be photographed into the view finder optical system 1.

FIG. 1 shows a state after an exposure is completed and before the shutter is cocked. In this state, the front shutter blade group 9 and rear shutter blade group 10 are unfolded to cover the exposure apertures 6a, 7a and 8a. The reflecting mirror 11 is in a position to lead a light from an object to be photographed into the view finder optical system. If the shutter is cocked in this state, through the driving means not illustrated, the rear shutter blade group 10 will be moved to a position to be folded as shown in FIG. 2, that is, to open the exposure apertures 7a and 8a and will be locked in this position. Thus, the driving means for the rear shutter blade group 10 will be held in the cocked position. At the same time, the driving means for the front shutter blade group 9 will be also moved to the cocked position and will be held in this position. In this case, the front shutter blade group 9 will remain held in the position in FIG. 1.

If a release button not illustrated of the camera is pushed in this state, first, the reflecting mirror will be sprung up as shown in FIG. 3, the light from the object to be photographed led into the view finder optical system 1 will be intercepted and, instead, will advance toward the exposure apertures 6a, 7a and 8a. Then, the driving means for the front shutter blade group 9 will be released and the front shutter blade group will move upward to open the exposure apertures 6a and 8a. Thus, the exposure to the film F will be started. In this case, the front shutter blade group 9 will be folded as shown in FIG. 3, will advance into the space 4 in the view finder optical system 1 and will stop. Then, when a certain time (exposure time) elapses, the driving means for the rear shutter blade group 10 will be released, the rear shutter blade group 10 will move to cover the exposure apertures 7a and 8a and thus one exposing operation will be completed. In the final step of the above mentioned movement of the rear shutter blade group 10, the front shutter blade group 9 will again return to cover the exposure apertures 6a and 8a and the reflecting mirror 11 will be also returned to the position in FIG. 1 in association with this returning motion. Thus, the light from the object to be photographed will be again introduced into the view finder optical system 1.

In a single lens reflex camera provided with such socalled quick return type focal plane shutter as is described above, an advancing port through which the front shutter blade group 9 advances into the space 4 in the view finder optical system 1 is required in the mechanism. In this kind of conventional camera, there have been defects that, as this advancing port is always open, a part of the light passing through the view finder optical system 1 will enter the shutter device through the above mentioned advancing port and, as a result, the film will be exposed by the light.

SUMMARY OF THE INVENTION

Therefore, an object of the present invention is to provide a focal plane shutter of the above mentioned type made to be able to positively prevent a light from leaking from a view finder optical system onto a film surface.

According to the present invention, this object can be attained by providing a shielding member which can allow a front shutter blade group to advance into a view finder optical system between the view finder optical system and a shutter device.

The shielding member is integrally formed with a partition plate of the shutter device and is arranged so as to form a closed space containing the rear shutter blade group in cooperation with the partition plate and the shutter base plate in the position closest to the film.

In a further development of the present invention, the shielding member is rotatably supported on the camera body or shutter base plate and is so arranged as to be able to close the advancing port for the front shutter blade group into the view finder optical system when the reflecting mirror is in the position of being able to lead the light from the object to be photographed into the view finder optical system and to be able to open the advancing port when the reflecting mirror is sprung up.

In a preferred further development of the present invention, the shielding member rotatably supported on the camera body or shutter base plate is so arranged as to be able to open the advancing port in association with the operation of pressing the release button of the camera and to be able to close the advancing port when the pressing of the release button is released.

In a preferred still further development of the present invention, the shielding member rotatably supported on the camera body or shutter base plate is operatively connected with an automatic diaphragm device of the camera and is so arranged as to be rotated to open the advancing port when the diaphragm device is operated.

This and other objects of the present invention will become more apparent during the course of the following detailed despription and appended claims.

DESCRIPTION OF THE PREFERRED EMBODIMENT

Figure 1:
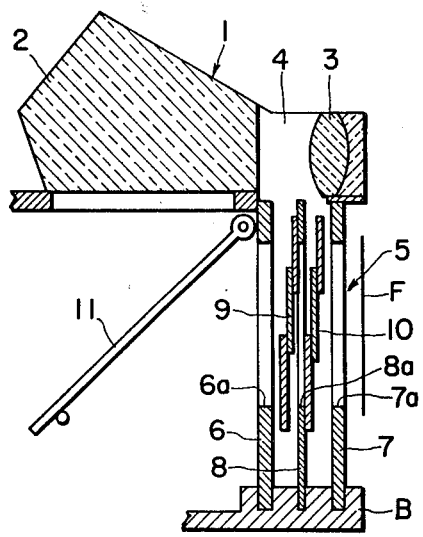
FIG. 1 is a schematic sectional view showing a conventional example in which the shutter device is in the uncocked state.
Figure 2:
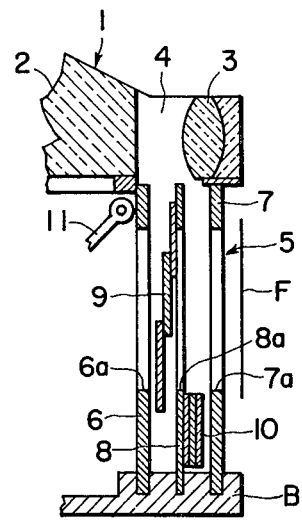
FIG. 2 is a schematic sectional view showing the conventional example in which the shutter device is in the cocked state.
Figure 3:
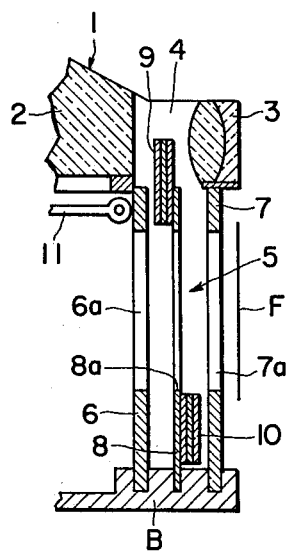
FIG. 3 is a schematic sectional view showing the conventional example in which the shutter device is in the opened state.

In the following description, the same numerals are used for the respective elements and parts identical with or silimar to those shown in FIGS. 1 to 3 and their detailed explanations shall be omitted.

Figure 4:
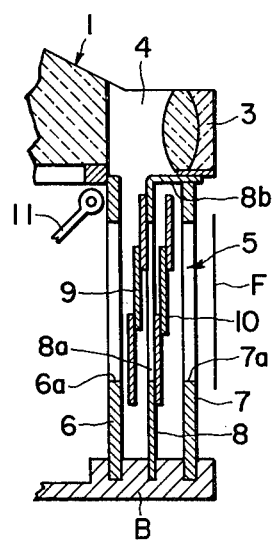
FIG. 4 is a schematic sectional view showing an embodiment of a focal plane shutter according to the present invention as corresponding to the state of FIG. 1.

FIG. 4 shows a first embodiment of the present invention. In this embodiment, noting that the rear shutter blade group 10 will not advance into the space 4 of the view finder optical system 1 during its operation, the upper portion of the partition plate 8 is bent over the entire width of the partition plate 8 to utilize this bent part 8b as a shielding member. This shielding member 8b is so formed as to be in close contact on the end edge with the upper edge of the shutter base plate 7 and on both side edges with the side walls of the camera body B so that the light passing through the view finder optical system 1 may not leak onto the film surface.

The shielding member 8b is formed by bending the upper portion of the partition plate 8 in this embodiment but may be also formed by bending the upper portion of the shutter base plate 7 toward the partition plate 8 or may be formed with another member than the partition plate 8 and shutter base plate 7. According to this method, the leakage of the light onto the film surface can be prevented most simply without increasing parts.

Figure 5:
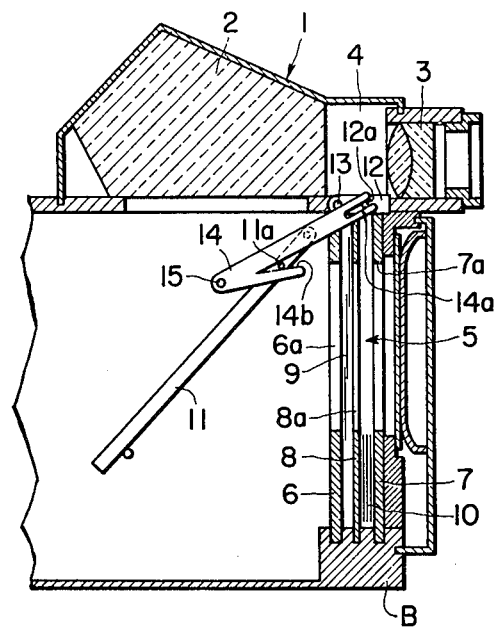
FIG. 5 is a schematic sectional view showing another embodiment of a focal plane shutter according to the present invention as corresponding to the state of FIG. 2.
Figure 6:
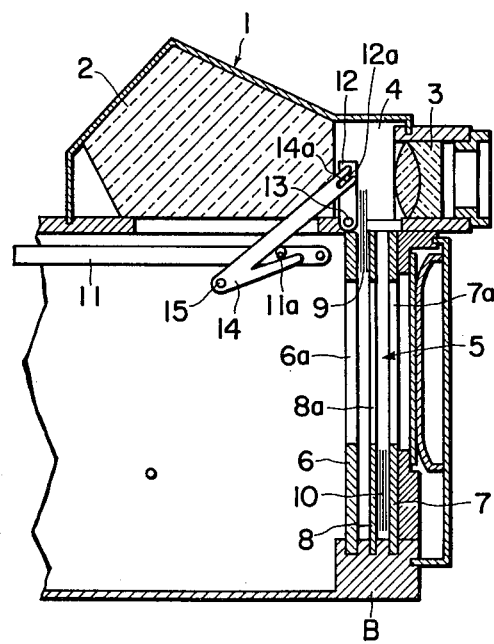
FIG. 6 is a schematic sectional view of the embodiment shown in FIG. 5 as corresponding to the state of FIG. 3.

FIGS. 5 and 6 show a second embodiment of the present invention. In this embodiment, the shielding member is formed so as to be able to be opened and closed and fundamentally so that the advancing port making the shutter device and the space of the view finder optical system communicate with each other may open only while the reflecting mirror is sprung up and the light led into the view finder optical system through the reflecting mirror from the object to be photographed is intercepted. That is to say, reference numeral 12 indicates a shielding member supported rotatably on the camera body B by a shaft 13 and having a pin 12a. This shielding member 12 is formed as a plate having a size which can seal the advancing port making the shutter device 5 and space 4 communicate with each other. Reference numeral 14 indicates an interlocking lever supported rotatably on the camera body B by a shaft 15 and having a fork portion 14a engaged with the pin 12a and an arm portion 14b engaged with a pin 11a provided on the reflecting mirror 11.

FIG. 5 shows the shutter as cocked. Therefore, the front shutter blade group 9 is in the position to cover the exposure apertures 6a and 8a and the rear shutter blade group 10 is in the position to open the exposure apertures 7a and 8a. The light from the object to be photographed is reflected by the reflecting mirror 11 and is led to the view finder optical system 1 and the shielding plate 12 closes the advancing port. Therefore, the light passing through the view finder optical system 1 will not leak onto the film surface. If a release button not illustrated of the camera is pushed, the reflecting mirror 11 will be sprung up to the position shown in FIG. 6 through such well known mirror driving means as is disclosed in U.S. Pat. No. 3,999,196 and, at the same time, the light from the object to be photographed so far led to the view finder optical system 1 will be intercepted so as to be able to advance toward the film surface. By this motion of the reflecting mirror 11, the interlocking lever 14 will be rotated counterclockwise. As a result, the shielding plate 12 will be also rotated counterclockwise to open the advancing port. Therefore, the advance of the front shutter blade group 9 into the space 4 will be made possible prior to such opening and closing operations of the front shutter blade group 9 and rear shutter blade group 10. The operating order of the front shutter blade group 9 and rear shutter blade group 10 and the returning motion of the reflecting mirror 11 have been already explained with reference to FIGS. 1 to 3 and therefore shall not be described here but can be more concretely understood with reference to the above mentioned U.S. Pat. No. 3,999,196. By the returning motion of the reflecting mirror 11 to the illustrated position performed in the final stage of the exposing operation, the shielding plate 12 will be also returned to the closed position through the interlocking lever 14 so that the leakage of the light onto the film surface will be able to be prevented.

Figure 7:
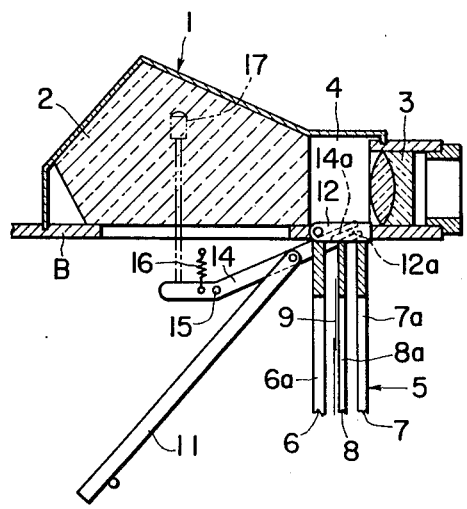
FIG. 7 is a schematic sectional view showing still another embodiment of a focal plane shutter according to the present invention as corresponding to the state of FIG. 2.

FIG. 7 shows a third embodiment of the present invention. In this embodiment, the interlocking lever 14 is biased clockwise by a spring 16 so as to be able to be operated directly by a release button 17 of the camera. That is to say, if the release button 17 is pushed down in the shutter cocked state as shown in FIG. 7, the reflecting mirror 11 will be sprung up as described above, at the same time, the interlocking lever 14 will be rotated counterclockwise against the spring 16 and, as a result, the shielding plate 12 will be also rotated counterclockwise to open the advancing port. Thereafter, when the normal exposure of the film surface is completed as described above, if the pressing force to the release button 17 is removed, the inrerlocking lever 14 will be rotated clockwise by the spring 16 and, as a result, the shielding plate 12 will be also rotated clockwise to close the advancing port. In this case, the interlocking lever 14 can be modified so as to be once locked by a locking means not illustrated when it is rotated counterclockwise by the release button 17 and to be returned to the illustrated position by operating the above mentioned locking means with the reflecting mirror or a member related with it when the front shutter blade group 9 is moved from the position shown in FIG. 6 to the position shown in FIG. 7 and the reflecting mirror 11 is returned to the illustrated position.

Figure 8:
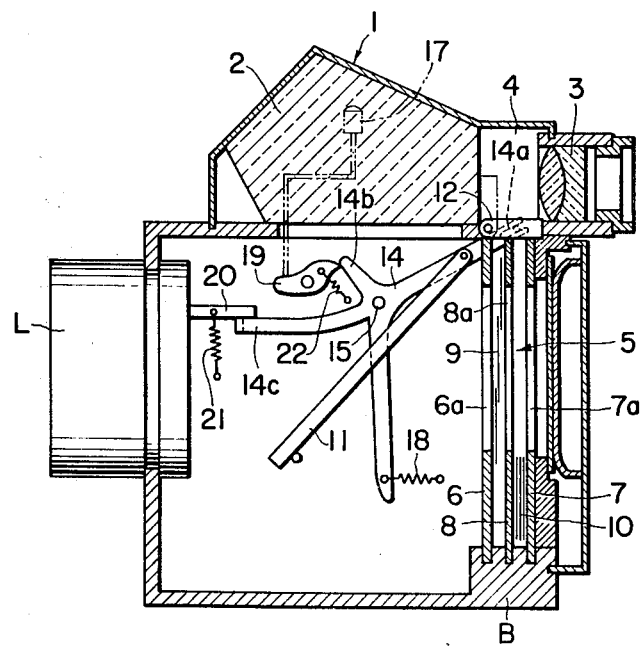
FIG. 8 is a schematic sectional view showing still another embodiment of a focal plane shutter according to the present invention as corresponding to the state of FIG. 2.

FIG. 8 shows a fourth embodiment of the present invention. In this embodiment, the interlocking lever 14 is so made as to be able to be utilized as an element of an automatic diaphragm operating means for a photographing lens L mounted to the camera body B. That is to say, the interlocking lever 14 is biased counterclockwise by a spring 18 and has an arm 14b engageable with a lock lever 19 which can be operated by the release button 17 of the camera and an arm 14c engageable with a diaphragm operating member 20 built in the photographing lens. Reference numeral 22 indicates a spring to bias the lock lever 19 clockwise. If the release button 17 is pressed in the shutter cocked state as shown in FIG. 8, the reflecting mirror 11 will be sprung up as already described and, at the same time, the lock lever 19 will be rotated counterclockwise against the spring 22 and will disengage from the arm 14b. Therefore, the interlocking lever 14 will be rotated counterclockwise by the spring 18 and, as a result, the shielding plate 12 will be also rotated counterclockwise to the position illustrated by the chain line to open the advancing port for the front shutter blade group 9. On the other hand, the arm 14c will be also rotated counterclockwise. Following this counterclockwise rotation, the diaphragm operating member 20 will also rotate around the optical axis to move diaphragm blades not illustrated to a predetermined diaphragm aperture position. On the other hand, the reflecting mirror 11 will be sprung up and the light will be prevented from being led into the view finder optical system. Then the film will be exposed. Finally, as described above, the front shutter blade group 9 and rear shutter blade group 10 will be returned to the illustrated positions and the reflecting mirror 11 will be also returned to the illustrated position. In the case of the returning motion of the reflecting mirror to the illustrated position, the interlocking lever 14 will be rotated counterclockwise against the spring 18 by an interlocking mechanism not illustrated and will be also again locked in the illustrated position by the engagement of the arm 14b with the lock lever 19. By this returning motion of the interlocking lever 14, the shielding plate 12 will be also returned to the closed position and the diaphragm operating member 20 will be also rotated to return the diaphragm blades to the fully opened position against the spring 21.

As apparent from the above description, the shielding member may be also provided to open and close the advancing port formed by the base plate 6 and partition plate 7 in FIG. 4.

As described above, the shielding member 12 is so made as to be moved from the closed position to the opened position by the interlocking lever 14 operated before the shutter blades operate to open and close the exposure aperture and to be moved from the opened position to the closed position by the interlocking lever 14 operated again by the returning motion of the reflecting mirror 11 or the release of the pressing of the release button 17 after the end of the exposing operation. Therefore, the film will not be carelessly exposed to a part of the light passing through the view finder optical system.

I claim:
1. A light leakage preventing device for focal plane shutters, comprising:
   a view finder optical system;
   a shutter device arranged to intersect at right angles with said view finder optical system and including therein a front shutter blade group a part of which can advance into said view finder optical system and a rear shutter blade group;
   a shielding member arranged between said view finder optical system and said shutter device to prevent a light passing through said view finder optical system from reaching the surface of a film to be arranged just after said shutter device and capable of allowing said front shutter blade group to advance into said view finder optical system;
   said shutter device including a first shutter base plate and a partition plate to define a first space for housing therein said front shutter blade group; said partition plate and a second shutter base plate defining a second space for housing said rear shutter blade group; and
   said shielding member closely covers the upper part of said second space, said shielding member being formed integrally with said partition plate.

2. A light leakage preventing device for focal plane shutters, comprising:
   a view finder optical system;
   a shutter device arranged to intersect at right angles with said view finder optical system and including therein a front shutter blade group a part of which can advance into said view finder optical system and a rear shutter blade group;
   a shielding member arranged between said view finder optical system and said shutter device to prevent a light passing through said view finder optical system from reaching the surface of a film to be arranged just after said shutter device and capable of allowing said front shutter blade group to advance into said view finder optical system;
   said shutter device including a pair of shutter base plates to define a space for housing therein said front shutter blade group and rear shutter blade group, and
   said shielding member being movable between a first position for closing the upper part of said space and a second position for opening the upper part of said space and being moved to said first position before said front shutter blade group and rear shutter blade group begin to operate and to said second position after the completion of the operations of said front shutter blade group and rear shutter blade group.

3. A light leakage preventing device for focal plane shutters, comprising:
- a view finder optical system;
- a shutter device arranged to intersect at right angles with said view finder optical system and including therein a front shutter blade group a part of which can advance into said view finder optical system and a rear shutter blade group;
- a shielding member arranged between said view finder optical system and said shutter device to prevent a light passing through said view finder optical system from reaching the surface of a film to be arranged just after said shutter device and capable of allowing said front shutter blade group to advance into said view finder optical system;
- said shutter device including a pair of shutter base plates to define a space for housing therein said front shutter blade group and rear shutter blade group, and said shielding member being movable between a first position for closing the upper part of said space and a second position for opening the upper part of said space and being associated with a reflecting mirror which can lead a light from an object to be photographed alternatively to said finder optical system and said film so as to be held in said first position when said reflecting mirror is in the position for leading said light into said view finder optical system and to be held in said second position when said reflecting mirror is in the position for directing said light toward said film.

4. A light leakage preventing device for focal plane shutters, comprising:
- a view finder optical system;
- a shutter device arranged to intersect at right angles with said view finder optical system and including therein a front shutter blade group a part of which can advance into said view finder optical system and a rear shutter blade group;
- a shielding member arranged between said view finder optical system and said shutter device to prevent a light passing through said view finder optical system from reaching the surface of a film to be arranged just after said shutter device and capable of allowing said front shutter blade group to advance into said view finder optical system;
- said shutter device including a pair of shutter base plates to define a space for housing therein said front shutter blade group and rear shutter blade group, and said shielding member being movable between a first position for closing the upper part of said space and a second position for opening the upper part of said space and being associated with a release button to be used to start the operations of said front shutter blade group and rear shutter blade group so as to be moved to said second position when said release button is pushed.

* * * * *